(No Model.)
G. K. SCHAUER.
HORSE HAY RAKE.
No. 350,699. Patented Oct. 12, 1886.
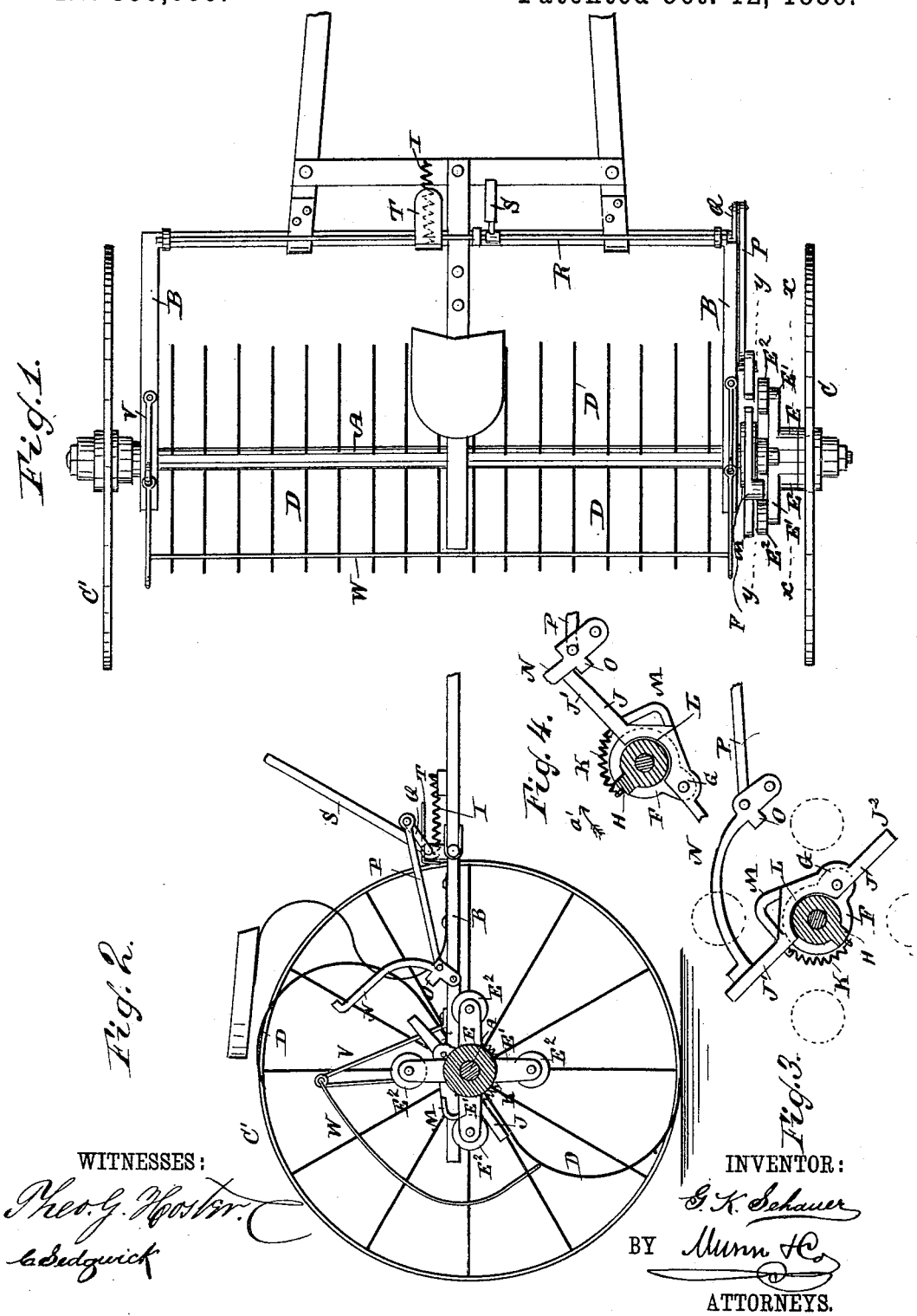
WITNESSES:
INVENTOR:
G. K. Schauer
BY 
ATTORNEYS.

UNITED STATES PATENT OFFICE.

GEORGE K. SCHAUER, OF OSBORN, OHIO.

HORSE HAY-RAKE.

SPECIFICATION forming part of Letters Patent No. 350,699, dated October 12, 1886.

Application filed December 18, 1885. Serial No. 186,103. (No model.)

*To all whom it may concern:*

Be it known that I, GEORGE K. SCHAUER, of Osborn, in the county of Greene and State of Ohio, have invented a new and Improved Horse Hay-Rake, of which the following is a full, clear, and exact description.

This invention relates to certain new and useful improvements in that class of hay-rakes mounted to revolve and discharge the hay collected.

The object of my invention is to facilitate the reversing of the rake for discharging the grass, &c.

The invention consists in the construction and combination of parts and details, as will be fully described and set forth hereinafter, and then pointed out in the claims.

Reference is to be had to the accompanying drawings, forming a part of this specification, in which similar letters of reference indicate corresponding parts in all the figures.

Figure 1 is a plan view of my improved rake. Fig. 2 is a cross sectional view on the line $x\,x$, Fig. 1. Fig. 3 is a detail cross sectional view on the line $y\,y$, Fig. 1. Fig. 4 is a similar view showing the parts in different positions.

The shaft A is suitably journaled in the frame B, to which shafts or a draft-pole is attached, and on the ends of the shaft the wheels C C' are loosely mounted. The S-shaped metal rake teeth or tines D are secured on the shaft A. On the hub of the wheel C the cross-shaped frame E is secured, which has four arms, E', and a roller, $E^2$, is pivoted on the end of each arm. Adjacent to the frame E the circumferentially-grooved disk F is rigidly mounted on the axle, and is provided with the two jaws G, and the lug H, projecting from the rim, and between the said jaws G the lever J is pivoted, which is connected by the spring K with the lug H, said spring pressing the lever from the rim of the disk, the lever being provided in its inner edge with the recess L, for receiving part of the disk F, as shown in Fig. 3. On the outer surface of the lever J the cam projection M is formed. On the end part of the frame B, adjacent to the wheel C, the curved arm N is pivoted, which is provided near its pivoted end with the lug O. The arm N is connected by the rod P with the crank Q on the end of the shaft R, journaled on the lugs of the front piece of the frame B. The said shaft R is provided with the handle S for turning it, and also with the foot-plate T, which also serves for turning said shaft. The spring I is secured to the thill-frame B and to a crank on the shaft R. The wire frame W is hung on uprights V on the frame B, and rests on the rear curved parts of the teeth or tines of the rake, and serves to scrape the grass off the tines when the grass is being discharged. The operation is as follows: When the hay is being raked and gathered by the lower set of tines, D, the machine being drawn forward, the pressure on the said tines tends to turn the shaft A in the direction of the arrow $a'$, Fig. 4. The arm N being held by means of the spring I acting on the shaft R and connecting-rod P in the position shown in Fig. 4, its lug O engages the end J' of the lever J, preventing the shaft A from turning and pressing the lever J closely against the disk F, whereby the cam projection M is held within the circle of rotation of the rollers $E^2$ on the frame E, revolving with the wheel C, and hence is not acted upon by said rollers. When the collected hay or grass is to be discharged from the lower tines, D, the handle or lever S is operated to disengage the lug O on the arm N from the lever J, and is then immediately returned to its normal position by means of the spring I acting as before stated. The lever J being released is pressed outward from the disk F by the spring K, throwing the cam projection M into the path of the rollers $E^2$ on the revolving frame E, whereby the cam is engaged by the rollers and the shaft A revolved in the direction of the arrow $a'$ with the frame E, and hence with the wheels C. The lower tines, D, are thus raised, discharging the hay, &c., collected by the same, and the hay, grass, &c., held on the tines is scraped off by the frame W. When the said tines are turned through half a revolution, the frame W swinging up to let them pass, the opposite tines, before inactive, are swung down to the same position and locked in place by the opposite end, $J^2$, of the lever J engaging the lug O on the arm N, which is held in the position of engagement by the spring I. As before, the pressure on the tines now active holds the lever J in contact with the periphery of the disk F, and hence the cam M out of the path of the revolving rollers E², allowing the wheels C and frame E to revolve freely. The active tines can now be discharged, when desired, by operating the handle S, as before, and so on, the opposite sets of tines being alternately in use. The tines can thus quickly be discharged and replaced without stopping the machine. When the tines are to be held and locked clear of the ground, as in going to and from the field, the handle S is operated to swing the arm N down, so as to engage the end J' or J² of the lever J, which thus supports the opposite sets of tines in a horizontal position, the lever J being pressed, as before, against the disk F and the cam M held out of engagement with the rollers E². The tines can thus be easily and quickly adjusted to the desired position.

Having thus described my invention, what I claim as new, and desire to secure by Letters Patent, is—

1. A vehicle-rake having the wheels loosely mounted on the axle, the tines secured on the axle, a frame carrying rollers fixed on one wheel, and a lever pivoted on a fixed piece on the axle and provided with a cam projection, and operating mechanism whereby said cam is thrown into and out of the path of said rollers, all combined substantially as herein shown and described.

2. In a rake, the combination, with an axle or shaft on which tines are secured, of wheels mounted loosely on the ends of the axle, a frame on the hub of one wheel, which frame carries rollers, a disk secured on the axle adjacent to said frame, a lever pivoted on said disk, and a spring for pressing the lever from the disk, and operating mechanism for holding said lever against the spring out of the path of said rollers, substantially as herein shown and described.

3. In a rake, the combination, with an axle on which tines are secured, of wheels mounted loosely on the ends of the axle, a frame on the hub of one of the wheels and carrying rollers, a disk on the axle, a lever pivoted on the disk, a spring for pressing the lever from the disk, and of a pivoted arm for locking the lever on the disk in different positions, substantially as herein shown and described.

4. In a rake, the combination, with an axle on which tines are secured, of wheels mounted loosely on the axle, the frame E on one wheel, the rollers E² on the frame, the disk F on the axle, the lever J, pivoted on the same, a spring for pressing the lever from the disk, and of the pivoted arm N, provided with the lug O, substantially as herein shown and described.

5. In a rake, the combination, with an axle on which tines are secured, of wheels mounted loosely on said axle, a frame on the hub of one of the wheels, rollers on said frame, a disk fixed on the axle, a lever provided with a cam projection pivoted on the disk, a spring for pressing the lever from the disk, and of a pivoted arm for locking said lever in place, substantially as herein shown and described.

6. In a rake, the combination, with the axle carrying tines, of wheels mounted loosely on the axle, a frame on one wheel, rollers on the frame, a disk on the axle, the lever J, pivoted to the disk and provided with a cam projection, the arm N, for locking the lever J in place, and of a crank-shaft on the frame of the rake connected with the arm N and provided with devices for operating it, substantially as herein shown and described.

GEORGE K. SCHAUER.

Witnesses:
DAVID M. MARTIN,
J. C. SMITH.